Aug. 22, 1933.  W. J. MADDEN  1,923,547
APPARATUS FOR COOLING PASSENGER CARS
Filed Oct. 20, 1932   2 Sheets-Sheet 1
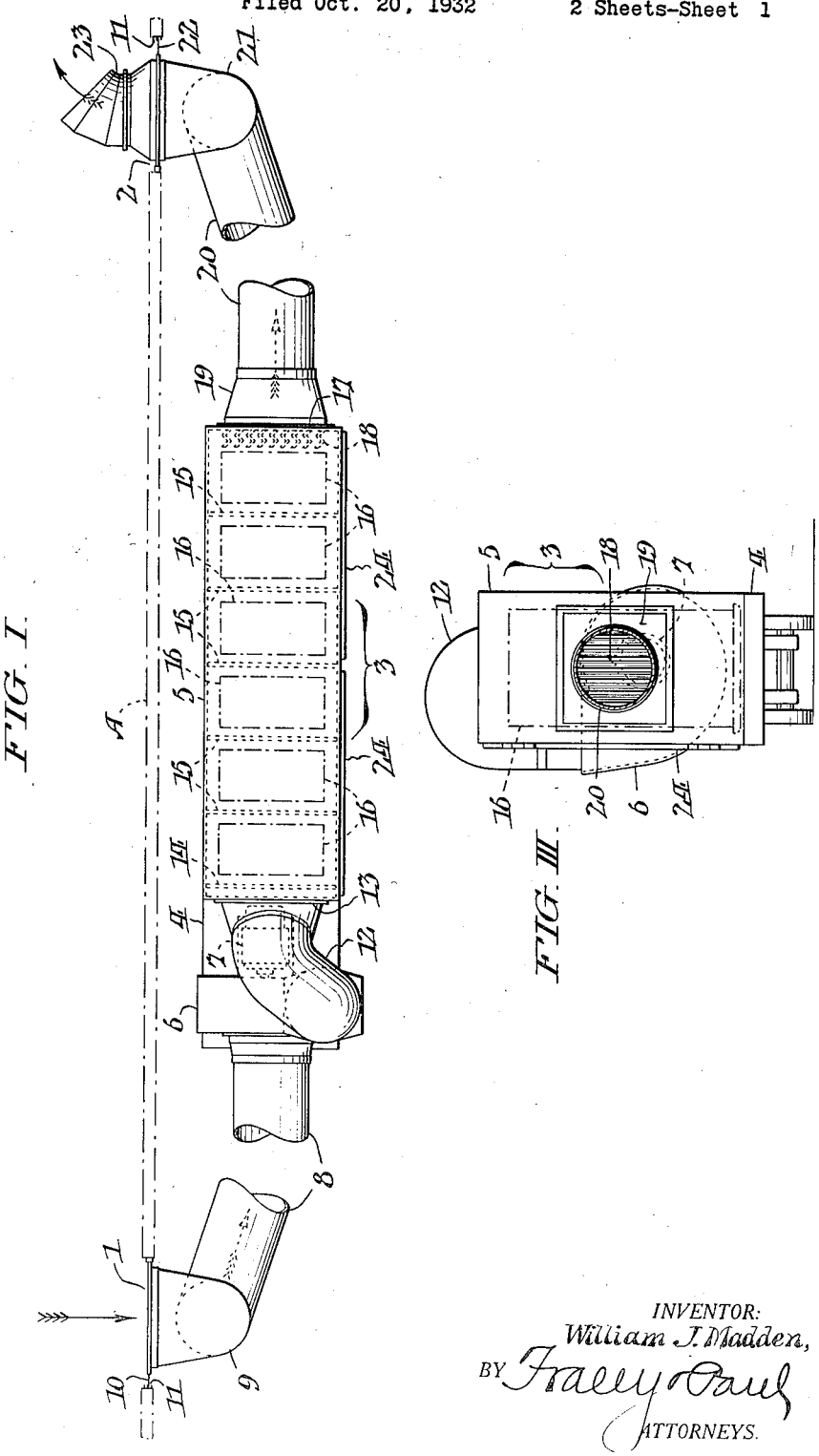
INVENTOR:
William J. Madden,
BY Fraley Paul
ATTORNEYS.

Aug. 22, 1933.  W. J. MADDEN  1,923,547
APPARATUS FOR COOLING PASSENGER CARS
Filed Oct. 20, 1932  2 Sheets-Sheet 2
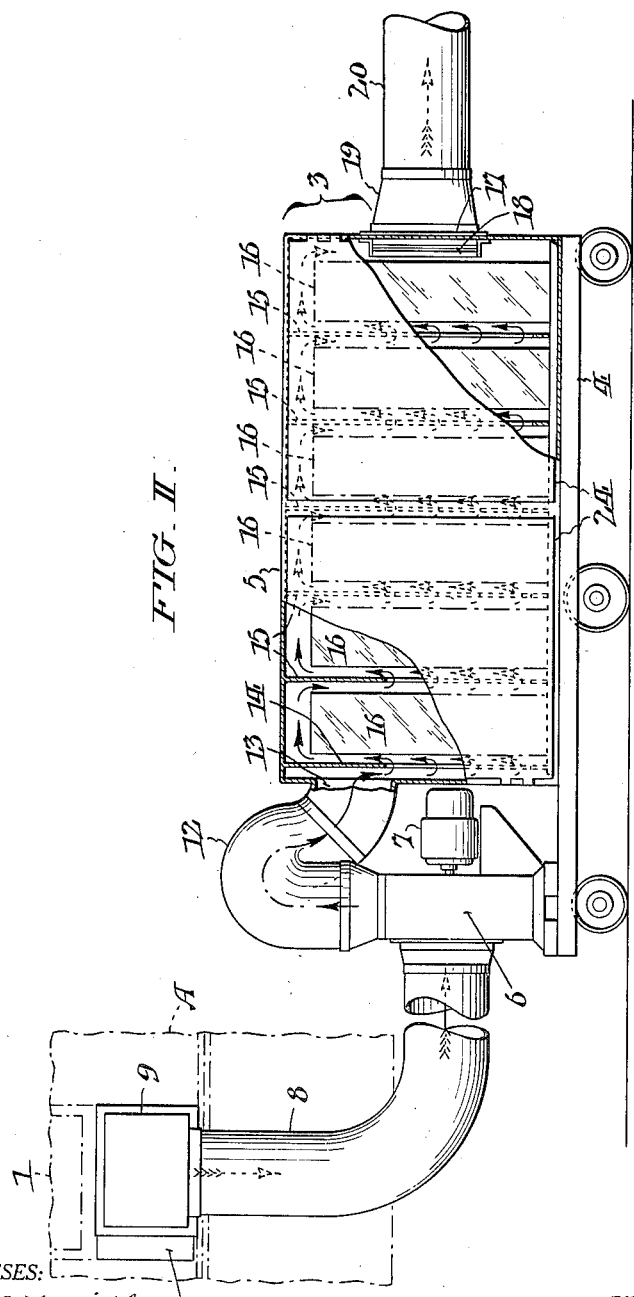
WITNESSES:
John A. Weidler
William Bell, Jr.
INVENTOR:
William J. Madden
BY Fraley Paul
ATTORNEYS.

Patented Aug. 22, 1933

1,923,547

UNITED STATES PATENT OFFICE 1,923,547

APPARATUS FOR COOLING PASSENGER CARS

William J. Madden, Lansdowne, Pa.

Application October 20, 1932. Serial No. 638,729

2 Claims. (Cl. 62—24)

This invention relates to apparatus for cooling passengers cars, and more particularly to apparatus for precooling such cars while standing at a station platform for a brief interval preparatory to departure.

Heretofore it has been proposed to precool passenger cars by bringing alongside the car a platform truck or the like carrying thereon an artificial air cooling chamber, and by blowing cooled air from such chamber through the side windows of the car. Such an apparatus is shown in my pending application for U. S. Letters Patent Serial No. 527,404, filed April 3, 1931. With apparatus of this character, it is most desirable that provision be made for speedily connecting the portable unit to the passenger car to which it is applied, and the cooling unit should be so designed and connected to the interior car as to cause the air therein to be conditioned and lowered in temperature quickly and economically.

Accordingly, the object of my invention is to provide a portable car cooling unit which can be readily applied to a passenger car while the latter is standing at a station platform, and which when operatively coupled to the car establishes a system of air circulation between the interior of the car and the exterior cooling chamber by means of which the air in the car may be cooled in a brief interval of time.

Other more specific objects and advantages characteristic of my invention will become more fully apparent from the description hereinafter of one example or embodiment thereof, having reference to the accompanying drawings. Of the drawings:

Fig. I represents a plan view of a portable car cooling unit of my invention applied to a railway passenger car.

Fig. II represents a side elevation of the same with certain portions of the side of the cooling chamber broken away to reveal the interior thereof; and, Fig. III represents an end elevation of the car cooling unit.

With reference to the drawings, there is shown at A a portion of a railway passenger car. At 1 there is indicated a side window of the car near one end of the passenger space. At 2 there is represented another side window more remote from that end of the car. Adjacent to the railway car A, and disposed in parallel arrangement therewith, there is a portable air cooling unit, comprehensively designated at 3. This unit is mounted on a wheeled truck 4 which is adapted to be moved along a station platform, and which, as shown in Fig. II, is relatively narrow, so that when the air cooling unit is coupled alongside a railway car, the platform upon which the truck 4 stands will not be obstructed to any substantial extent. On the truck 4 there is mounted an air cooling chamber or refrigerator 5 and a fan or blower 6 driven by an electric motor 7. The truck 4 is brought alongside the railway car A to a position in which the fan or blower 6 is near the window 1 at one end of the car. From the fan or blower 6 a suction duct 8 leads to the window 1. The duct 8 is preferably made of flexible material such as canvas, and is reinforced or stiffened by wire rings or the like, so as to prevent its collapse under suction. The flexible duct 8 terminates in a connection 9 which is adapted to be removably attached to a window of the passenger car. The window connection 9 includes an extensible frame 10 which can be adjusted to fit within railway car windows of different aperture. The coupling of the window connection 9 to the car is effected by raising the window sash and inserting the extensible frame 10 within the opening, then spreading the frame 10 to engage in grooves 11 at the sides of the window, and then lowering the sash onto the top of the extensible frame 10.

Air from the interior of the passenger car A is drawn through the flexible duct 8 by the fan 6 and is discharged through a short duct 12 which leads from the top of the blower 6 to one end of the air cooling chamber 5. The duct 12 communicates with the intake passage 13 at the end of the air cooling chamber 5, and air is discharged by the blower 6 through the intake passage 13 and through openings in a baffle plate 14 to the first cooling stage of the air cooling chamber 5. The cooling chamber 5, in the present example of my invention, is divided longitudinally into six compartments, these compartments being defined by transverse partition plates 15 which extend downward from the top of the air cooling chamber. Each compartment is of a size to conveniently accommodate a block of ice such as represented at 16. Access to these compartments is had by means of swinging doors 24 at the front of the cooling chamber 5.

Air passing through the intake passage 13 follows a course upward over the first cake of ice, then downward beneath the lower edge of the first partition plate 15, then upward over the second cake of ice, and so on throughout the cooling chamber. Ultimately the air passes out of the cooling chamber through the discharge passage 17. At the discharge passage there is placed an eliminator 18 for removing moisture from the air. The eliminator in the present example of my invention comprises a series of plates defining narrow tortuous passages. At the discharge passage 17 there is provided a transition connection 19 which at its end nearest to the air cooling chamber 5 is rectangular in cross section, and at its opposite end is circular in cross section. To the transition connection 19 there is attached a flexible discharge duct 20. The duct 20 leads to a nozzle 21 at the window 2 of the railway car A. The nozzle 21 has thereon an extensible frame 22 similar to the previously described frame 10 of the window connection 9. The nozzle 21 is removably attached to the window 2 and includes an elbow 23 which enters into the interior of the car and directs the current of air toward the end of the car opposite to the end at which the suction duct 8 is applied.

It will be especially observed that the window connection 9 and the nozzle 21, including its elbow 23, are all part of the portable cooling apparatus 3 and are normally housed on the truck 4. To couple the portable air cooling apparatus 3 to a railway car, it is only necessary to extend the flexible intake duct 8 and discharge duct 20 and to apply the window connection 9 and window nozzle 21 to the windows in the manner described. According to the practice of my invention, the intake duct 8 is made relatively short as compared to the discharge duct 20 and the air cooling apparatus is brought to a position near one end of the car. In consequence there is a relatively short passage from the window at which warm air is exhausted from the car to the blower 6. This is an advantage because it is particularly important that the intake duct 8 shall not collapse under suction.

It is to be particularly noted that the portable air cooling apparatus is so connected to the railway car as to form a single closed system of air circulation in which a high velocity cold air stream is projected within the interior of the car toward one end of the passenger space, while warm air rises and flows to the other end and is there exhausted at the suction window. The result of this arrangement is to produce turbulence within the car, giving a more effective distribution to the incoming cooled air, and reducing the period required to condition the air in a car while it stands at a station.

While I have shown the compartments of the cooling chamber 5 each filled with large cakes of ice 16, I have found that it is occasionally desirable to fill one or more compartments with the normal accumulation of broken ice while filling the remaining compartments with cake ice. This results in a saving of labor and a lower temperature of air due to the more intimate contacts of the air currents through the mass of broken ice.

The operation of the air cooling unit of my invention will be apparent from the above description of its constituent elements. When the motor 7 is started, rotation of the blower 6 causes warm air to be exhausted through the window 1 of the car A and to be drawn through the intake duct 8 and the connecting duct 12 to the intake passage 13 of the air cooling chamber. The air then passes around the cakes of ice 16 following the course indicated by the arrows in Fig. II. From the end of the air chamber 5 the cooled air passes through the eliminator 18, at which point moisture is removed, and then through the transition connection 19 and the flexible duct 20 to the discharge nozzle 21. From the elbow 23 of the nozzle 21 the cold air is directed in a high velocity stream into the interior of the car toward the opposite end from that at which the relatively warm air is exhausted.

While I have described one particular example of apparatus designed for the practice of my invention, it will be apparent that various changes may be made in the form of this apparatus without departing from the spirit of the invention as defined in the claims hereto annexed.

Having thus described my invention, I claim:

1. In apparatus for cooling passenger cars while not in motion, the combination of a platform truck placed alongside a passenger car in parallel arrangement therewith, an air refrigerator mounted upon said truck with air inlet and air outlet passages at opposite ends thereof, a short flexible intake duct extending from the inlet passage of the refrigerator to a window near one end of the car; a long flexible discharge duct extending from the outlet passage of the refrigerator to another window more remote from that end of the car, said intake duct being stiffened to prevent its collapse under suction, and said outlet duct leading through the window to which it is applied and terminating in a nozzle directed toward the opposite end of the car, and a blower for effecting continuous circulation of air through said refrigerator and ducts, whereby a single closed system of air circulation may be established in which a high velocity cold air stream is projected toward one end of the car while warm air is exhausted from the other end of the car.

2. In apparatus for cooling passenger cars while not in motion, the combination of a platform truck placed alongside of a passenger car, an air refrigerator mounted upon said truck with air inlet and air outlet passages at opposite ends thereof, a blower mounted on the truck in proximity to the inlet passage of the refrigerator and communicating therewith, a short flexible intake duct extending from the inlet passage of the refrigerator to a window near one end of the car, and a long flexible discharge duct extending from the outlet passage of the refrigerator to a window more remote from that end of the car, the said flexible intake duct being stiffened to prevent its collapse under suction, and the said discharge duct terminating in an extensible frame capable of fitting tightly into car windows of different aperture, and carrying a nozzle directed toward the opposite end of the car.

WILLIAM J. MADDEN.